US011198622B2

(12) United States Patent
Weng

(10) Patent No.: US 11,198,622 B2
(45) Date of Patent: Dec. 14, 2021

(54) WATER PURIFICATION SYSTEM, WATER DISPENSER AND WASHING BASIN APPLYING THE SAME

(71) Applicants: Ginger Water Processing Technology Co., Ltd., Zhubei (TW); Lin-Song Weng, Zhubei (TW)

(72) Inventor: Lin-Song Weng, Hsinchu County (TW)

(73) Assignees: Ginger Water Processing Technology Co., Ltd., Zhubei (TW); Lin-Song Weng, Zhubei (TW)

( * ) Notice: Subject to any disclaimer, the term of this patent is extended or adjusted under 35 U.S.C. 154(b) by 173 days.

(21) Appl. No.: 16/379,458

(22) Filed: Apr. 9, 2019

(65) Prior Publication Data
US 2019/0308885 A1 Oct. 10, 2019

(30) Foreign Application Priority Data
Apr. 10, 2018 (TW) .................... 107112318

(51) Int. Cl.
| | |
|---|---|
| C02F 1/04 | (2006.01) |
| C02F 1/00 | (2006.01) |
| C02F 9/00 | (2006.01) |
| B01D 1/16 | (2006.01) |
| B01D 5/00 | (2006.01) |
| B01D 1/28 | (2006.01) |
| C02F 1/48 | (2006.01) |

(Continued)

(52) U.S. Cl.
CPC .............. *C02F 1/001* (2013.01); *B01D 1/16* (2013.01); *B01D 1/28* (2013.01); *B01D 5/006* (2013.01); *C02F 1/041* (2013.01); *C02F 1/042* (2013.01); *C02F 1/48* (2013.01); *C02F 9/00* (2013.01); *C02F 1/32* (2013.01); *C02F 1/482* (2013.01); *C02F 2103/18* (2013.01); *C02F 2307/10* (2013.01)

(58) Field of Classification Search
CPC ........ C02F 1/041; C02F 9/00; C02F 2307/10; C02F 1/482; C02F 1/32; C02F 2103/18; C02F 9/005; C02F 1/042; C02F 1/48; C02F 1/481; C02F 1/36; C02F 1/001; B01D 1/16; B01D 5/006; B01D 1/28
See application file for complete search history.

(56) References Cited

U.S. PATENT DOCUMENTS 5,156,747 A * 10/1992 Weber .................. B01D 1/0082
202/197
2019/0308889 A1* 10/2019 Weng ...................... C02F 1/041

FOREIGN PATENT DOCUMENTS

CN 105836948 A * 8/2016

* cited by examiner

*Primary Examiner* — Matthew O Savage
(74) *Attorney, Agent, or Firm* — Birch, Stewart, Kolasch & Birch, LLP

(57) ABSTRACT

A water purification system, a water dispenser and a washing basin applying the same for purifying a raw water to be treated without filtering to a usable fresh water. The water purification system includes a water filtering device coupled to a water intake to filter a raw water to be treated; a first water storage tank coupled to the water filtering device for storing the raw water after being filtered; a nebulization device coupled to the first water storage tank for nebulizing the raw water after being filtered into a water fog; a condensation device coupled to the nebulization device for condensing the water fog; and a second water storage tank coupled to the condensation device for storing a recycled water generated by condensing the water fog.

8 Claims, 3 Drawing Sheets

(51) Int. Cl.
*C02F 103/18* (2006.01)
*C02F 1/32* (2006.01)

WATER PURIFICATION SYSTEM, WATER DISPENSER AND WASHING BASIN APPLYING THE SAME

BACKGROUND OF THE INVENTION

1. Field of the Invention

The present invention relates to a water purification system, and more particularly to a recycled water purification system and application thereof.

2. Description of Related Art

With the increase of population, environmental pollution, and climate change, the freshwater resources of the earth are depleted. The purification and reuse of water resources has become an important issue.

In daily life, the use of water is nothing more than drinking and washing. If water resources can be recovered and reused from these two main use scenarios, the utilization of fresh water can be effectively improved.

SUMMARY OF THE INVENTION

The present invention provides a water purification system for purifying a raw water to be treated without filtering to usable fresh water, and the water purification system comprises: a water filtering device coupled to a water intake to filter a raw water to be treated; a first water storage tank coupled to the water filtering device for storing the raw water after being filtered; a nebulization device coupled to the first water storage tank for nebulizing the raw water after being filtered into a water fog; a condensation device coupled to the nebulization device for condensing the water fog; and a second water storage tank coupled to the condensation device for storing a recycled water generated by condensing the water fog.

Wherein further comprising a sterilizing device coupled to the second water storage tank for sterilizing the recycled water. Wherein the sterilizing device comprises an ultraviolet tube.

Wherein further comprising a magnetizing device coupled to the first water storage tank for magnetizing the raw water after being filtered.

Wherein the magnetizing device is realized by a strong magnet.

Wherein the nebulization device uses a mechanical nozzle or an ultrasonic oscillator to nebulize the raw water after being filtered to generate the water fog.

Wherein the condensation device includes a pressurizing device and a spiral condensation tube with diameter from big to small, and pressurizing device blow the water fog to the spiral condensation tube to condense the water fog in order to generate the recycled water.

The present invention also provides a water dispenser comprising: a raw water storage tank, and the raw water storage tank has a water inlet coupled to a water source to obtain a first raw water; a water filtering device coupled to the raw water storage tank for filtering the first raw water in order to generate a filtered raw water; an usable water storage tank coupled to the water filtering device and a recycled water outlet for storing the filtered raw water and the recycled water after being processed; a drinking water outlet coupled to the usable water storage tank for outputting a drinking water; a recycled water collection tank for collecting a second raw water which is remained after using the drinking water; a nebulization device coupled to the recycled water collection tank for nebulizing the second raw water in order to generate a water fog; a condensation device coupled to the nebulization device for condensing the water fog in order to generate the recycled water; and a recycled water storage tank coupled to the condensation device for storing the recycled water.

The present invention also provides a washing basin comprising: a water inlet coupled to a water source to obtain a raw water; a recycled water inlet for storing a recycled water; an usable water storage tank coupled to the water inlet and a recycled water inlet to store a raw water and a recycled water, and providing an usable water through a water outlet; a washing basin coupled to the usable water storage tank for providing the usable water to an user and providing with a water output port for storing a raw water to be treated of the usable water after being used; a first water storage tank coupled to the water output port for storing a raw water to be treated of the usable water after being used; a water filtering device coupled to the first water storage tank for filtering the raw water to be treated in order to generate the raw water after being filtered; a nebulization device coupled to the water filtering device to nebulize the raw water after being filtered into a water fog; a condensation device for condensing the water fog; and a second water storage tank coupled to the condensation device for storing the recycled water condensed from the water fog.

DETAILED DESCRIPTION OF THE PREFERRED EMBODIMENT

Figure 1:
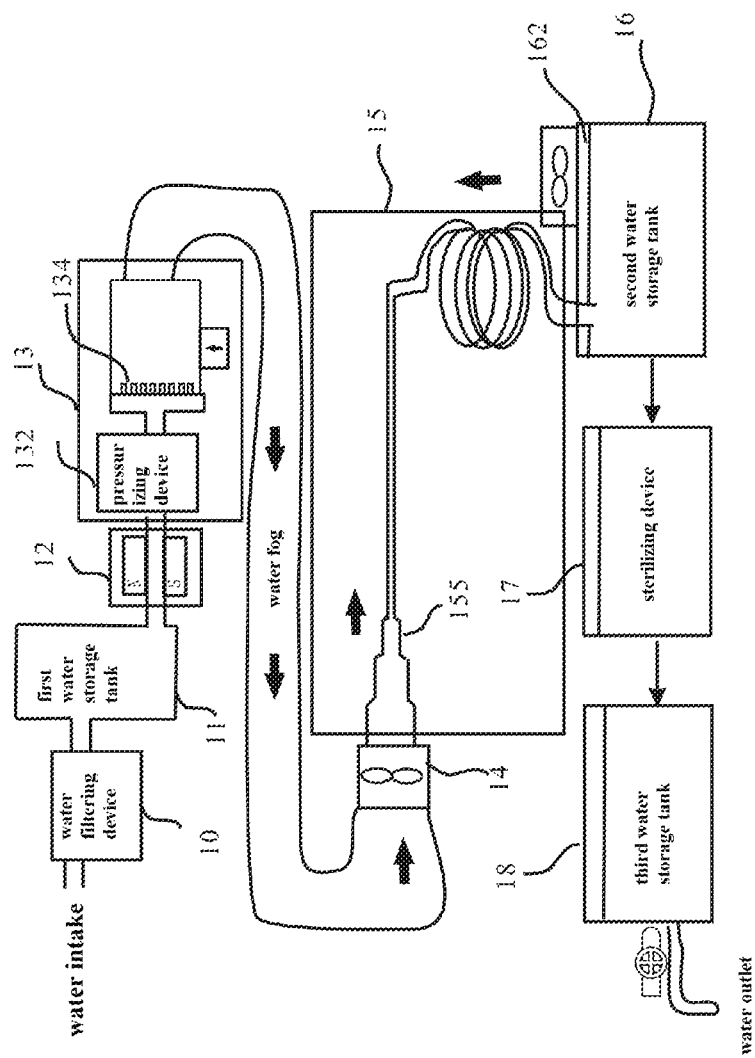
FIG. 1 is a schematic diagram of a water purification system according to an embodiment of the present invention.

FIG. 1 is a schematic diagram of a water purification system according to an embodiment of the present invention. A water intake of the water purification system is coupled to a water source such as a tap water and a recycled water. A raw water inputting to the water purification system and required to be treated is filtered through a water filtering device 10 in advance. Then, the raw water after being filtered is stored in a first water storage tank 11. The filtering device 10 can be anyone of water filters. The number of filter layers and filter core design can be selected according to an actual requirement such as RO reverse osmosis water filtering system, multiple or single high density sterilization filter core, or filtering mesh with low cost.

A nebulization device 13 is coupled to the first water storage tank 11 for nebulizing the raw water after being filtered to a water fog. In the present embodiment, a magnetizing device 12 is coupled between the first water storage tank 11 and the nebulization device 13 for magnetizing the raw water after being filtered. The raw water after being magnetized can reduce the generation of the scale in the following process and extends the system life. However, in another embodiment, the magnetizing device 12 can be omitted with cooperating the selection of the filtering device 10. The nebulization device 13 can nebulize the raw water after being filtered through a pressurizing device 132 and a mechanical nozzle 134. An ultrasonic oscillator (not shown)

can be selected to nebulize the raw water after being filtered into fine water fog. Then, through blower and other delivering methods to blow the water fog to a condensation device 15.

The condensation device 15 is coupled to the nebulization device 13, and having a spiral condensation tube with diameter from big to small. Through a depressurizing and condensing way, the water fog is condensed to generate a recycle water. The second water storage tank 16 is coupled to the condensation device 15 to store the recycled water condensed from the water fog. A second water storage tank 16 is provides with a fog-filtering mesh 162 to further filter the gas generated in the previous process. Preferably, the recycled water condensed in the second water storage tank 16 kills the microorganism existed therein through a sterilizing device 17, and then, storing in the third water storage tank 18, and providing to a water outlet to people in order to ensure the water safety. The sterilizing device 17 can be realized by an ultraviolet tube.

In the embodiment of FIG. 1, the magnetizing device 12 can be disposed between the filtering device 10 and the first water storage tank 11. The magnetizing device 12 is a strong magnet. Using the strong magnet to magnetize the water passing through the magnetizing device 12. Through the above magnetizing and nebulization process, the impurity particles existed in the raw water after being filtered is stayed in the nebulization device 13. The water fog condensed in the condensation device 15 is almost a pure water, and after sterilization, the water can be a drinking water. If only used for washing, the sterilizing device 17 and a third water storage tank 18 can be omitted, directly providing water by the second storage tank 16.

Figure 2:
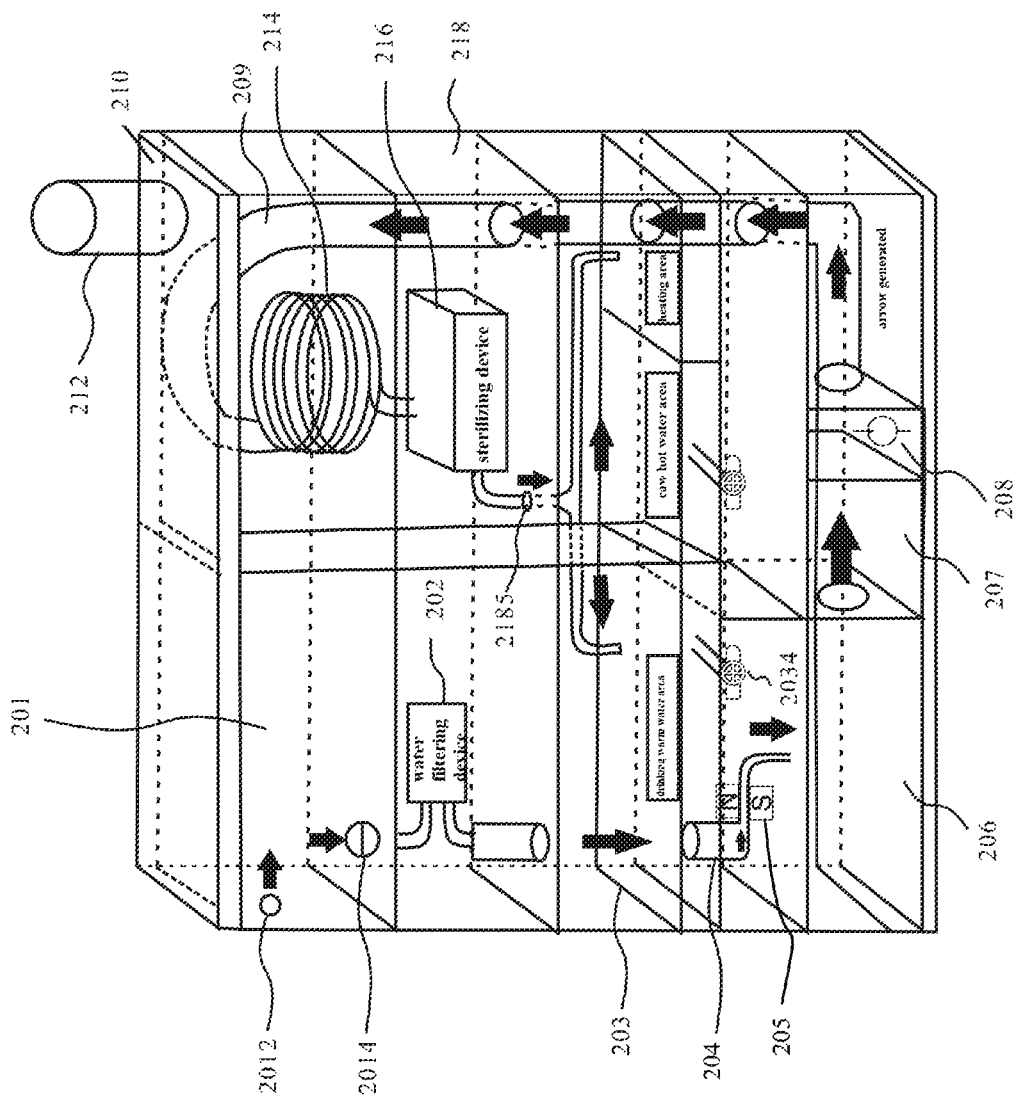
FIG. 2 is a schematic diagram of water dispenser applying the purification system of the present invention.

FIG. 2 is a schematic diagram of water dispenser applying the purification system of the present invention. As shown in FIG. 2, the water dispenser includes a raw water storage tank 201, and the raw water storage tank 201 has a water inlet 2012 coupled to a water source to obtain a first raw water; a water filtering device 202 coupled to the raw water storage tank 201 for filtering the first raw water in order to generate a filtered raw water; an usable water storage tank 203 coupled to the water filtering device 202 and a recycled water outlet 2185 for storing the filtered raw water and the recycled water after being processed; a drinking water outlet 2034 coupled to the usable water storage tank 203 for outputting a drinking water. In the present embodiment, for cooperating the heating function in the water dispenser, the usable water storage tank 203 includes a drinking warm water area, a raw hot water area and a heating area; however, the present invention is not limited.

The drinking water provided by the usable water storage tank 203 provides to a user through a drinking water outlet 2034. At the same time, the remaining second raw water after the drinking water is used is collected to a recycled water collection tank 204, and after the second raw water is magnetized by the magnetizing device 205, the second raw water is nebulized as a water fog at the nebulization device 206, and stored in a fog collection tank 207. Through a delivering direction as shown by an arrow generated by a pumping motor 208, passing through the condensation device 209 having a spiral condensation tube 214 to condense as a recycled water and stored in the recycled water storage tank 218. In the present embodiment, the sterilizing device 216 is an ultraviolet tube disposed in the recycled water storage tank 218. The recycled water storage tank 218 is also provided with a fog-filtering mesh 210 and an exhaust vent 212. As described above, the magnetizing device 205 can be omitted according to a requirement. In another embodiment, another water filtering device can further disposed in the recycled water collection tank 204 in order to further filter the second raw water.

Figure 3:
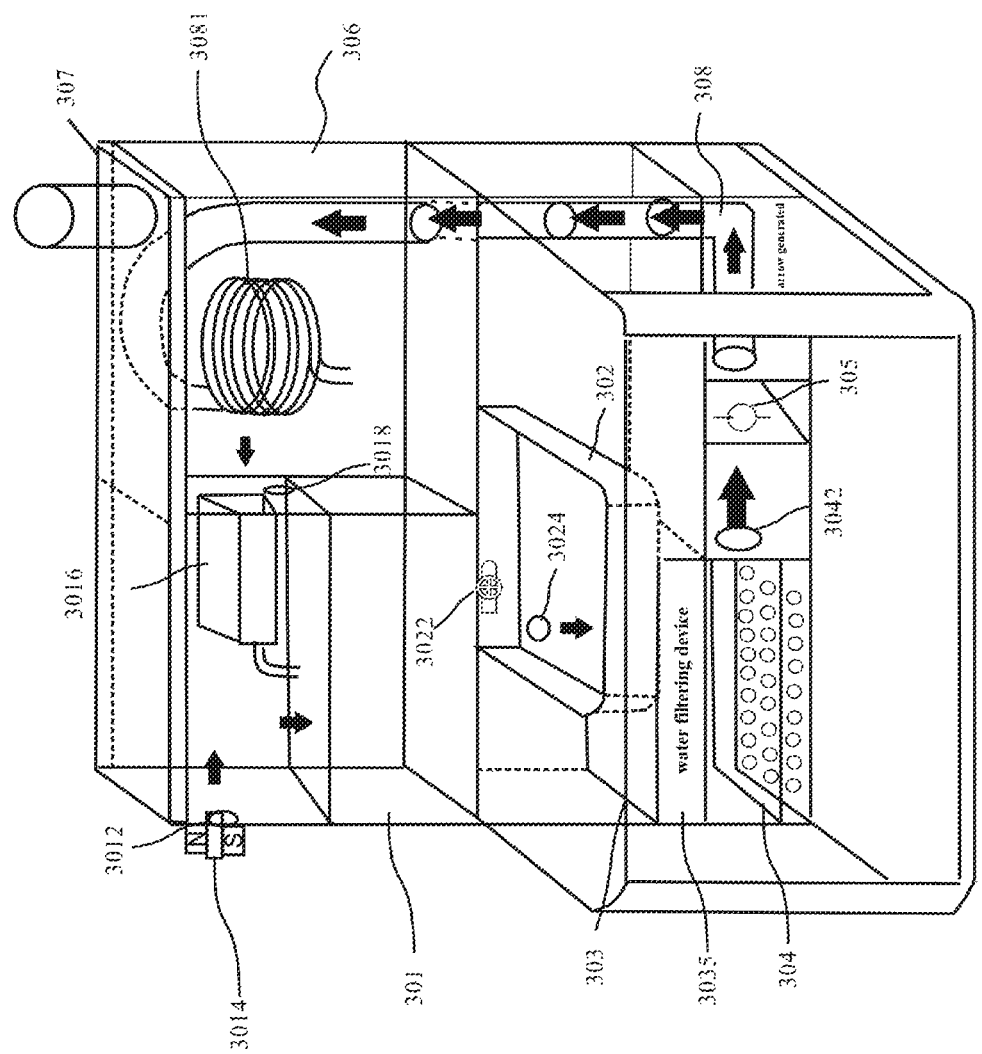
FIG. 3 is a schematic diagram of a washing basin applying the purification system of the present invention.

FIG. 3 is a schematic diagram of a washing basin applying the purification system of the present invention. The washing basin includes a water inlet 3012 coupled to a water source to obtain a raw water. A magnetizing device 3014 disposed at the water inlet 3012, and the magnetizing device 3014 can be disposed at an usable water storage tank 301 or an outside of the usable water storage tank 301 (as shown in the figure). The magnetizing device 3014 can also be disposed in the usable water storage tank 301. The usable water storage tank 301 coupled to the water inlet 3012 and a recycled water inlet 3018 to store a raw water and a recycled water, and providing with a sterilizing device 3016 (such as an ultraviolet tube). The usable water is provided to washing basin 302 through the water outlet 3022. The washing basin 302 is used for providing the usable water to a user, and providing with a water output port 3024. The first water storage tank 303 is coupled to the water output port 3024 for storing a raw water to be treated of the usable water after being used. The water filtering device 3035 is coupled to the first water storage tank for filtering the raw water to be treated in order to generate the raw water after being filtered. The nebulization device 304 is coupled to the water filtering device 3035 to nebulize the raw water after being filtered into a water fog. The pumping motor 305 delivers the water fog into the condensation device 308 through a through hole 3042. Finally, the water fog finishes a depressurizing and condensing way to generate a recycled water through a spiral condensation tube 3081. The second water storage tank 306 is coupled to the condensation device 308 and providing with a fog-filtering mesh 307 for storing the recycled water condensed from the water fog.

In the embodiment shown in FIG. 3, because the usable water finally provided is used for cleaning, not for drinking so that the water filtering device 3035 can use a filtering water with low price to reduce the cost.

What is claimed is:

1. A water dispenser comprising:
    a raw water storage tank having a water inlet coupled to a water source to obtain a first raw water;
    a water filtering device coupled to the raw water storage tank for filtering the first raw water in order to generate a filtered raw water;
    a usable water storage tank coupled to the water filtering device and a recycled water outlet for storing the filtered raw water and the recycled water after being processed;
    a drinking water outlet coupled to the usable water storage tank for outputting a drinking water;
    a recycled water collection tank for collecting a second raw water which is remained after using the drinking water;
    a nebulization device coupled to the recycled water collection tank for nebulizing the second raw water in order to generate a water fog;
    a condensation device coupled to the nebulization device for condensing the water fog in order to generate the recycled water; and
    a recycled water storage tank coupled to the condensation device for storing the recycled water.

2. The water dispenser according to claim 1, wherein further comprising a sterilizing device disposed in the recycled water storage tank for sterilizing the recycled water.

3. The water dispenser according to claim 2, wherein the sterilizing device comprises an ultraviolet tube.

4. The water dispenser according to claim 1, wherein further comprising a magnetizing device coupled to the recycled water collection tank and the nebulization device for magnetizing the second raw water.

5. The water dispenser according to claim 4, wherein the magnetizing device is realized by a strong magnet.

6. The water dispenser according to claim 1, wherein the nebulization device uses a mechanical nozzle to nebulize the raw water after being filtered to generate the water fog.

7. The water dispenser according to claim 1, wherein the condensation device includes a pressurizing device and a spiral condensation tube with diameter from big to small, and pressurizing device blow the water fog to the spiral condensation tube to condense the water fog in order to generate the recycled water.

8. The water dispenser according to claim 1, wherein the recycled water storage tank is provided with a fog-filtering mesh.

\* \* \* \* \*